United States Patent Office
3,634,329
Patented Jan. 11, 1972

3,634,329
POLYMERIZATION CATALYST COMPOSITION CONTAINING CHELATE COMPLEX COMPOUND OF ACETYLACTONE AND TRIVALENT MANGANESE
Kiyoshi Chujo and Zenjiro Honda, Saitama, Japan, assignors to Daicel Ltd., Osaka, Japan
No Drawing. Filed Dec. 5, 1968, Ser. No. 781,575
Int. Cl. C08f 15/00
U.S. Cl. 252—431       5 Claims

ABSTRACT OF THE DISCLOSURE

The polymerization of monomers and mixtures thereof, selected from the group consisting of vinyl esters, acrylic esters, methacrylic esters, acrylonitrile, methacrylonitrile, styrene, vinyl chloride, vinylidene chloride and 1,3-butadiene can be effected at relatively low temperatures using a catalyst composition comprising a metal chelate complex compound of acetylacetone and trivalent manganese and an additive compound selected from the group consisting of carboxylic acids, aldehydes, alcohols, primary aliphatic amines, zinc chloride, hydrochloric acid and phosphoric acid.

BACKGROUND OF THE INVENTION

Field of the invention

This invention relates to a new catalyst composition for polymerizing monomers or monomer mixtures and a process for polymerizing monomers or monomer mixtures in the presence of said new catalyst composition and, more particularly, relates to a catalyst composition consisting of a metal chelate complex compound of acetylacetone with trivalent manganese and an additive compound selected from the group of compounds, as hereinafter defined, for conducting a polymerization of monomers or monomer mixtures selected from the group of monomers, as hereinafter defined.

Description of the prior art

It is already known that a metal chelate complex compound of acetylacetone with trivalent manganese can initiate the polymerization of methyl methacrylate and styrene at a high temperature above 60° C. (Kastning: Ang. Chem. International Edition), 4, 322 (1965); Bamford et al.: Chem. & Ind., 1627 (1965)). However, a disadvantage of the processes wherein said metal chelate complex compound is used alone as a catalyst has been the insufficient polymerizing activity of the catalyst at a temperature below 60° C., by virtue of which the catalyst will show substantially no polymerization initiating action at room temperature, such as 20° C.

An object of the present invention is to provide a new catalyst composition for polymerizing various kinds of monomers or monomer mixtures, as hereinafter defined, which catalyst composition consists essentially of a metal chelate complex compound of acetylacetone with trivalent manganese and an additive compound, as hereinafter defined, in which the polymerization initiating action of the catalyst is remarkably increased by the coexistence of said metal chelate complex compound with said additive compound.

A further object of the present invention is to provide an improved process for polymerizing various kinds of monomers or monomer mixtures in the presence of a new catalyst composition consisting of a metal chelate complex compound of acetylacetone with trivalent manganese and an additive, as hereinafter defined, so that the initiation of the polymerization is remarkably improved and the polymerization can be conducted at room temperature.

SUMMARY OF THE INVENTION

According to the present invention there is provided a new catalyst composition for polymerizing various kinds of monomers or monomer mixtures which catalyst composition consists essentially of a metal chelate complex compound of acetylacetone with trivalent manganese and an additive compound selected from the group consisting of carboxylic acids, aldehydes, alcohols, primary aliphatic amines, zinc chloride, hydrochloric acid and phosphoric acid. Further, according to the present invention, there is provided a process for preparing a polymerization product which comprises polymerizing a monomer selected from the group consisting of vinyl esters, acrylic esters, methacrylic esters, acrylonitrile, methacrylonitrile, styrene, vinyl chloride, vinylidene chloride and 1,3-butadiene, and mixtures of said monomers, in the presence of a catalyst composition consisting of a compound of acetylacetone with trivalent manganese and an additive compound selected from the group consisting of carboxylic acids, aldehydes, alcohols, primary aliphatic amines, zinc chloride, hydrochloric acid and phosphoric acid. According to this invention, there can be obtained an unexpected and advantageous result that the polymerization and copolymerization of the above-mentioned monomers can proceed smoothly even at room temperature, such as 20° C.

The carboxylic acids which can be used in the present invention comprise all saturated or unsaturated monovalent and bivalent aliphatic and aromatic carboxylic acids. Such carboxylic acids include formic acid, acetic acid, propionic acid, butyric acid, valeric acid, lauric acid, myristic acid, palmitic acid, stearic acid, benzoic acid, oxalic acid, adipic acid, sebacic acid, terephthalic acid, isophthalic acid, crotonic acid, itaconic acid, acrylic acid, fumaric acid and cinnamic acid. The aldehydes which can be used in the present invention comprise monoaldehydes, which include such saturated aliphatic and aromatic aldehydes as formaldehyde, acetaldehyde, n-butylaldehyde, isobutylaldehyde and benzylaldehyde. The alcohols which can be used in the present invention comprise lower primary alkenols, which include methanol, ethanol, propanol, n-butanol and isobutanol. The primary aliphatic amines which can be used in the present invention comprise primary alkyl amines having from 4 to 8 carbon atoms, which include butylamine, n-hexylamine and octylamine.

The vinyl ester to be used in the present invention comprises compounds represented by the general formula

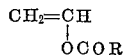

wherein R is hydrogen or an alkyl group having from 1 to 18 carbon atoms. The vinyl esters suitable for polymerization in the process according to this invention comprise vinyl formate, vinyl acetate, vinyl propionate, vinyl n-butyrate, vinyl versatate (vinyl esters of synthetic branched chain fatty acids), vinyl laurate and vinyl stearate. Further, a copolymer system consisting of a major amount of a vinyl ester and a minor amount of another polymerizable monomer can also be used in the present invention.

The acrylic ester to be used in the present invention comprises compounds represented by the general formula

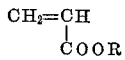

wherein R is an alkyl group having from 1 to 18 carbon atoms. The acrylates suitable for polymerization in the process according to this invention comprise methyl acrylate, ethyl acrylate, butyl acrylate, isobutyl acrylate, octyl acrylate and 2-ethylhexyl acrylate. Further, a copolymer system consisting of a major amount of an acrylic ester and a minor amount of another polymerizable monomer can also be used in the present invention.

The methacrylic ester to be used in the present invention comprises compounds represented by the general formula

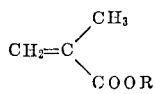

wherein R is an alkyl group having from 1 to 18 carbon atoms. The methacrylates suitable for polymerization in the process according to this invention comprise methyl methacrylate, ethyl methacrylate, propyl methacrylate, butyl methacrylate, isobutyl methacrylate, 2-ethylhexyl methacrylate, lauryl methacrylate, stearyl methacrylate and cyclohexyl methacrylate. Further, a copolymer system consisting of a major amount of a methacrylic ester and a minor amount of another polymerizable monomer can also be used in the present invention.

Other monomers which can be used in the present invention are, as described above, acrylonitrile, methacrylonitrile, styrene, vinyl chloride, vinylidene chloride and 1,3-butadiene. Further, a copolymer system consisting of a major amount of one of these monomers and a minor amount of another polymerizable monomer can also be used.

It should be noted that all catalyst compositions which fall within the scope of the present invention are not equally effective for polymerizing all of the various kinds of monomers described above. Rather, different kinds of additive compounds suitable for the polymerization of the respective monomer or the respective group of monomers can be used, depending on the kinds of monomers to be polymerized in the polymerization process of this inveniton. Accordingly, the preferred kinds of additive compounds for the respective monomer or the respective group of monomers shall now be described.

(1) Vinyl esters

The metal chelate complex compound of acetylacetone and trivalent manganese, even when used alone (without an additive), polymerizes vinyl esters to some degree. But the extent of polymerization is very unsatisfactory. We investigated not only trivalent maganese but also such metallic ions as, for example, Mn (II), Co (II), Co (III), Cr (III), Fe (II), Fe (III), TiO (II), V (II), VO (III), Ni (II) and Cu (III). However, only the complex compounds of Mn (II), Co (II) and Co (III) showed even a slight polymerizing activity and the others were quite inactive.

The additive effectively used in the catalyst composition for the polymerization of vinyl esters is an n-electron donor having an ionization potential of 9.8 to 11.3 ev. and having no carbon-carbon double bond. The ionization potential is, as is well known, the minimum work done or required for an atom or molecule to become a cation. Its values are described in detail, for example, on page 1126 in Fundamental Part 2 of "Kagaku Binran (Chemical Manual) (1960)" compiled by Japan Chemical Society. The n-electron donor is a compound having an unbonded electron pair which is easy to excite. An amine, an alcohol, an ether and a compound containing N, O or S are such -electron donors. The preferred additives for use in the present invention for the polymerization of vinyl esters include methanol, ethanol, propanol, n-butanol, isobutanol, tert-butanol, formic acid, acetic acid, propionic acid, formaldehyde and acetaldehyde. Acrylic acid, acrylonitrile, acrylamide, acrolein and 1,2-dichloroethylene are n-electron donors having an ionization potential of 9.8 to 11.3 ev. but they have carbon double bonds and, therefore, they are unsatisfactory. Further, n-hexane, n-octane and cyclohexane have an ionization potential of 9.8 to 11.3 ev. and they have no carbon-carbon double bond, but they are not n-electron donors and, therefore, they are unsatisfactory. Aniline, n-butylamine, phenol, water, carbon tetrachloride and chloroform are n-electron donors having no carbon-carbon double bond but they do not have an ionization potential of 9.8 to 11.3 ev. and, therefore, they are unsatisfactory.

(2) Acrylates

The metal chelate complex compound of acetylacetone and metallic ions shows no polymerizing activity on acrylic esters when used alone (without an additive) but it shows a strong polymerization initiating action when it is used with the additive according to the present invention. Any metal chelate complex compound of metallic ions, other than $Mn^{3+}$ ions according to the present invention, and acetylacetone shows substantially no polymerizing activity not only when alone but also even when used with the additive according to the present invention. Examples of metallic ions which are weak in activity are bivalent manganese, bivalent and trivalent cobalt, bivalent copper, bivalent iron, trivalent iron, trivalent chromium bivalent nickel, bivalent TiO, trivalent vanadium and divalent VO.

The preferred additives for use in the catalyst for the polymerization of acrylic esters according to the present invention include formic acid, acetic acid, hydrochloric acid, formaldehyde, aliphatic primary amines and zinc chloride as mentioned above. Fatty acids higher than acetic acid have no activity at all. Any aldehyde higher than acetaldehyde shows no activity at all. Further, alcohols show no activity.

(3) Methacrylates

The metal chelate complex compound of acetylacetone and trivalent manganese to be used according to the present invention even when used alone (without an additive) has some actio of polymerizing methacrylic esters but the polymerizing action is not sufficient. However, when such a complex compound is used with the additive according to the present invention, it shows an unexpectedly strong polymerization initiating action. Any complex compound of metallic ions, other than trivalent manganese ions, and acetylacetone shows substantially no polymerizing activity not only when used alone but also even when used together with an additive according to the present invention.

The preferred additives for the polymerization of methacrylic esters include all of the carboxylic acids and saturated monoaldehydes described above. For the carboxylic acids there can be used all of the saturated or unsaturated monovalent and bivalent aliphatic and aromatic carboxylic acids. As examples, there can be enumerated formic acid, acetic acid, propionic acid, butyric acid, valeric acid, lauric acid, myristic acid, palmitic acid, stearic acid, oxalic acid, adipic acid, sebacic acid, terephthalic acid, isophthalic acid, benzoic acid, crotonic acid, itaconic aid, acrylic acid, fumaric acid and cinnamic acid. Further, as monoaldehydes, there an be used such aliphatic and aromatic aldehydes as formaldehyde, acetaldehyde, n-butylaldehyde, isobutylaldehyde and benzylaldehyde. The formaldehyde may be used in the gaseous and pure state, but even commercial formalin (aqueous solution of formaldehyde) shows a strong polymerization accelerating action. Such dialdehydes and unsaturated aldehydes as glyoxal, glutaraldehyde, acrolein and cinnamic aldehyde have some polymerization initiating activity but there is no particular advantage as compared with the case of not adding them.

(4) Acrylonitrile and methacrylonitrile

The metal chelate complex compound of acetylacetone and trivalent manganese to be used in the present invention when used alone (without an additive) is not seen to have any action of initiating the polymerization of acrylonitrile and methacrylonitrile. However, when this metal chelate complex is used with an additive according to the present invention, such a metal chelate complex catalyst compound shows an unexpectedly strong polymerization initiating action. Any complex compound of metallic ions, other than trivalent manganese ions, and acetylacetone shows substantially no polymerizing activity not only when used along but also even when used with the additive according to the present invention.

The preferred additives for the polymerization of acrylonitrile and methacrylonitrile include carboxylic acids such as those above described, phosphoric acid and formaldehyde.

Phosphoric acid containing up to about 15% water can be effectively used. Further, the formaldehyde may be in a gaseous and pure state, but even commercial formalin shows a strong polymerization accelerating action. Any aldehyde higher than acetaldehyde shows no polymerization accelerating action at all.

Formic acid, acetic acid and formaldehyde are preferred as catalyst additives for the polymerization of styrene, formic acid and formaldehyde are preferred as catalyst additives for the polymerization of vinyl chloride, and formaldehyde is preferred as a catalyst additive for the polymerization of vinylidene chloride and 1,3-butadiene.

In the present invention, the amount of the above-mentioned metal chelate complex catalyst compound used is not critical, but it generally used in an amount of from 0.01 to 2 mol percent, preferably 0.1 to 1 mole percent, based on the mols of the monomer to be polymerized. Further, the amount of the additive used in the catalyst is not critical and its optimum amount is different depending on the kind of the additive used. However, it is generally used in an amount of from 0.1 to 10 mols to 1 mol of the metal chelate complex compound of acetylacetone with trivalent manganese. The polymerization reaction temperature can be suitably selected at temperatures below 150° C. However, it is a great advantage of the present invention that, if the catalyst system of the present invention is used, the polymerization will easily proceed even at such a low temperature below 50° C.

The reason why the catalyst system of the present invention has a strong polymerization initiating action is still not clear. The polymerization of monomers using an acetylacetone-manganese catalyst system has been generally considered to be due to a radical polymerization mechanism. However, in the case of the present invention, in view of the facts that (1) only such special additives as are mentioned above act sufficiently strongly and that (2) according to the results obtained by the inventors, both the polymerization rate and the polymer molecular weight increase with the progress of the polymerization in some cases, the reaction according to the process of the present invention is evidently different in its behavior from the conventional stationary state chain polymerization reaction.

DESCRIPTION OF THE PREFERRED EMBODIMENTS

The present invention shall be explained in detail with reference to the following examples, which are given to further illustrate the invention and are not intended as limitations thereof.

EXAMPLE 1

17.9 g. of vinyl acetate were put into a glass ampoule, 0.10 g. of a complex compound of acetylacetone and trivalent manganese and 0.031 ml. of ethanol (of an ionization potential of 10.55 ev.) were added thereto, the atmosphere in the ampoule was replaced with nitrogen gas and then the ampoule was fuse-sealed. In this case, the metal chelate complex compound was used in an amount of 0.15 mol percent based on the mols of monomer used and the mol ratio of ethanol to the complex compound was 1:1. In the following, unless otherwise specified, the metal chelate complex compound was 0.15 mol percent on the monomer and the additive was used at a mol ratio to the complex compound of 1:1. This fuse-sealed ampoule was dipped in a thermostatic bath at 50° C. and a polymerization was conducted while rotating and stirring it. After about 30 minutes, the solution gradually became viscous and the progress of the polymerization was recognized. After five hours, the ampoule was taken out of the bath and the contents were dissolved in methanol containing hydroquinone, and were reprecipitated with water and were then dried to obtain a light brownish colored polymer. Further, by repeating the purification of the polymer or treating it with a metal chelating agent such as EDTA or acetylacetone, there could be obtained a substantially colorless polymer. The polymerization yield reached 66.5%, the molecular weight of the polymer was about 270,000 and the syndiotactic part content was about 41%. Further, the branching degree was $2.3 \times 10^{-4}$, which meant that there was only about one branch per 5,000 repeated units.

Control 1

When a polymerization was conducted in exactly the same manner as in Example 1, except that no ethanol was added, the polymerization yield was only 8.4%.

Control 2

When a polymerization was conducted in exactly the same manner as in Example 1 except that phenol (of an ionization potential of 8.90 ev.) was used in place of the ethanol, the polymerization yield was only 10.3%.

Control 3

When a polymerization was conducted in exactly the same manner as in Example 1, except that carbon tetrachloride (of an ionization potential of 11.47 ev.) was used in place of the ethanol, the polymerization yield was only 13.2%.

Control 4

When a polymerization was conducted in exactly the same manner as in Example 1, except that diisopropylamine (of an ionization potential of 7.84 ev.) was used in place of the ethanol, no polymerization occurred at all.

Control 5

When a polymerization was conducted in exactly the same manner as in Example 1, except that water (of an ionization potential of 12.68 ev.) was used in place of the ethanol, no polymerization occurred at all.

Control 6

When a polymerization was conducted in exactly the same manner as in Example 1, except that n-hexane (of an ionization potential of 10.44 ev.) was used in place of the ethanol, the polymerization yield was only 0.6%. Also when cyclohexane (of an ionization potential of about 10.5 ev.) was used in place of the ethanol, the polymerization yield was 0.5%.

Control 7

When a polymerization was conducted in exactly the same manner as in Example 1, except that acrylamide (of an ionization potential of 10.36 ev.) was used in place of the ethanol, the polymerization yield was 12.5%. Further, when acrylonitrile (of an ionization potential of 10.75 ev.) was used in place of the ethanol, no polymerization occurred at all.

EXAMPLE 2

A polymerization was conducted in exactly the same manner as in Example 1, except that isobutanol (of an ionization potential of 10.17 ev.) was used in place of the ethanol and the polymerization temperature was 40° C. The polymerization yield was 54.6%, the molecular weight of the polymer was about 270,000 and the syndiotactic part content was about 40%.

EXAMPLE 3

A polymerization was conducted in exactly the same manner as in Example 1, except that acetic acid (of an ionization potential of 10.53 ev.) was used in place of ethanol. The polymerization yield was 58.0%, the molecular weight of the polymer was about 290,000, the syndiotactic part content was about 43% and the branching degree was $2.2 \times 10^{-4}$.

EXAMPLE 4

A polymerization was conducted in exactly the same manner as in Example 1, except that Formalin (37% solution of formaldehyde in water), (the ionization potential of the formaldehyde was 10.85 ev.) was used in place of the ethanol and the mol ratio of the formaldehyde to the complex compound was 2:1. The polymerization yield was 62.4%, the molecular weight of the polymer was about 270,000 and the syndiotactic part content was about 48%. It is to be particularly noted that there was a strong activity even though the reactants contained water supplied in the Formalin.

EXAMPLE 5

A polymerization was conducted in exactly the same manner as in Example 1, except that formic acid (of an ionization potential of 11.2 ev.) was used in place of the ethanol. The polymerization yield was 53.2%, the molecular weight of the polymer was about 230,000, the syndiotactic part content was about 45% and the branching degree was $3.0 \times 10^{-4}$.

EXAMPLES 6–11

A polymerization was conducted in exactly the same manner as in Example 3, except that the polymerizing time was three hours and the mol ratio of the additive to the complex compound was varied. The results were as listed in the following table.

| Example No.: | Additive/ metal chelate complex compound (mol ratio) | Polymerization yield (percent) | Molecular weight of the polymer |
|---|---|---|---|
| 6 | 0.5:1 | 36.0 | About 260,000. |
| 7 | 1:1 | 42.2 | About 240,000. |
| 8 | 2:1 | 53.5 | About 220,000. |
| 9 | 5:1 | 67.4 | About 210,000. |
| 10 | 10:1 | 83.5 | About 200,000. |
| 11 | 100:1 | 86.8 | About 180,000. |

EXAMPLE 12

A polymerization was conducted in exactly the same manner as in Example 1, except that the mol ratio of the additive to the metal chelate complex compound was 0.7:1 and the polymerizing temperature was 30° C. At each polymerizing time listed below, the polymerization was stopped, the polymer was taken out and its properties were measured. The results were as listed in the following table.

As will be understood from the table, even at a polymerization temperature of 30° C., there was a sufficient polymerizing activity, the molecular weight of the polymer gradually increased with the increase of the polymerization rate and a behavior different from that of an ordinary stationary state chain polymerization was shown.

| Polymerizing time (hrs.) | Polymerization yield (percent) | Molecular weight of the polymer |
|---|---|---|
| 0.3 | 8.5 | About 130,000 |
| 0.5 | 18.5 | About 170,000 |
| 1 | 38.2 | About 230,000 |
| 2 | 49.5 | About 270,000 |
| 4 | 58.5 | About 290,000 |
| 7 | 64.0 | About 270,000 |

EXAMPLE 13

A polymerization was conducted in exactly the same manner as in Example 1, except that vinyl propionate was used in place of vinyl acetate. The polymerization yield was 69.5% and the molecular weight of the polymer as computed by considering that the viscosity formula of polyvinyl acetate was established as being about 250,000. Further, the branching degree determined in the same manner as in the case of polyvinyl acetate was $5.3 \times 10^{-4}$.

EXAMPLE 14

A polymerization was conducted in exactly the same manner as in Example 10 except that vinyl n-butyrate was used in place of the vinyl acetate. The polymerization yield was 78.5% and the molecular weight of the polymer as computed from the viscosity formula of polyvinyl acetate was about 160,000.

EXAMPLE 15

A copolymerization was conducted in exactly the same manner as in Example 1, except that 16.5 g. of vinyl acetate and 1.4 g. of ethyl acrylate were used. The polymerization yield was 63.6% and the molecular weight of the copolymer as determined from the viscosity formula of polyvinyl acetate was about 350,000.

EXAMPLE 16

A copolymerization was conducted in exactly the same manner as in Example 10, except that a mixture of 8.5 parts of vinyl acetate, 1.2 parts of butyl acrylate and 0.3 part of crotonic acid (as a comonomer) by mol was used in place of the vinyl acetate. The polymerization yield was 82.6% and the molecular weight of the copolymer as computed by using the viscosity formula of polyvinyl acetate was about 220,000.

EXAMPLE 17

17.5 g. of methyl acrylate were put into a glass ampoule, 0.10 g. of a metal chelate complex compound of acetylacetone and trivalent manganese and 0.02 ml. of acetic acid were added thereto, the atmosphere in the ampoule was replaced with nitrogen gas and the ampoule was fuse-sealed. In this case, the metal chelate complex compound was used in an amount of 0.15 mol percent based on the mols of the monomer used and the mol ratio of the acetic acid to the complex compound was 1:1. In the following, unless otherwise specified, the complex compound was 0.15 mol percent on the monomer and the additive was used at a mol ratio to the complex compound of 1:1. This fuse-sealed ampoule was dipped in a thermostatic bath at 50° C. and a polymerization was conducted while rotating and stirring it. After about four hours, the solution quickly became viscous and the progress of the polymerization was recognized. After five hours, the ampoule was taken out and the contents were dissolved in acetone containing hydroquinone, the insoluble part was filtered, and it was then reprecipitated with water and then was dried to obtain a light brownish colored polymer. Further, by repeating the purification of the polymer or treating it with metal chelating agents such as EDTA or acetylacetone, there could be obtained a substantially colorless polymer. The polymerization yield was 91.5% and the rate occupied by the acetone-insoluble part in the whole polymer was 17.9%. The reduced viscosity of the acetone-soluble part was 5.05 and was quite high.

Control 8

When a polymerization was conducted in exactly the same manner as in Example 17, except that no acetic acid was added, no polymerization occurred at all.

Control 9

When a polymerization was conducted in exactly the same manner as in Example 17, except that propionic acid was used in place of the acetic acid, the polymerization yield was 0.

Control 10

When a polymerization was conducted in exactly the same manner as in Example 17, except that a metal chelate complex compound with iron (III) was used in place of the complex compound with manganese (III), the polymerization yield was 0.

EXAMPLE 18

A polymerization was conducted in exactly the same manner as in Example 17, except that formaldehyde (in fact, Formalin was used) was used in place of the acetic acid. In this case, in one hour, it was recognized that the polymerization had already considerably progressed. In five hours, the polymerization yield was 96.3% and was substantially complete. No acetone-insoluble part was present. The reduced viscosity of the polymer was 2.25. It is to be particularly noted that, even with Formalin containing a large amount of water, excellent results were obtained. When only water was used as an additive, no polymerization occurred at all.

Control 11

When acetaldehyde was used in place of the formaldehyde in Example 18, no polymerization occurred at all.

Control 12

When methanol used in place of formaldehyde in Example 18, no polymerization occurred at all.

Control 13

When a nickel (II)-metal chelate complex compound was used in place of the manganese (III)-metal chelate complex compound in Example 18, no polymerization occurred at all.

EXAMPLE 19

A polymerization was conducted in exactly the same manner as in Example 17, except that ethyl acrylate was used in place of the methyl acrylate and formic acid was used in place of the acetic acid. Then, the polymerization yield was substantially 100%, the acetone insoluble part was 14.5% and the reduced viscosity of the polymer was 2.14.

EXAMPLE 20

A polymerization was conducted in exactly the same manner as in Example 1, except that 2-ethylhexyl acrylate was used in place of the methyl acrylate and n-hexylamine was used in place of the acetic acid. The polymerization yield was 72.6%. There was no acetone insoluble part. The reduced viscosity of the polymer was 4.48 and was quite high.

Control 14

When diisopropylamine was used in place of the n-hexylamine in Example 20, no polymerization occurred at all.

Control 15

When aniline was used in place of the n-hexylamine in Example 4, no polymerization occurred at all.

EXAMPLE 21

A polymerization was conducted in exactly the same manner as in Example 17, except that 0.04 ml. of concentrated hydrochloric acid was used in place of the acetic acid. In 10 minutes after the initiation of the polymerization, the polymerization had already considerably progressed and the color of the metal chelate complex compound was light. In five hours, the polymerization yield was about 100%, there was no acetone-insoluble part and the reduced viscosity of the polymer was 4.21 and was quite high.

EXAMPLE 22

A polymerization was conducted in exactly the same manner as in Example 19, except that zinc chloride was used in place of the formic acid. In one hour of the polymerizing time, the polymerization had considerably progressed. The polymerization yield was 92.6%. The acetone-insoluble part was 38.0%. The reduced viscosity of the polymer was 2.86.

EXAMPLE 23

A polymerization was conducted in the same manner as in Example 17, except that the polymerizing temperature was 30° C., the polymerizing time was three hours and the amount of addition of the acetic acid was 2, 5 and 10 times (by mol) as large as that of the metal chelate complex compound. Then, the polymerization yield was 52.5, 74.3 and 78.6%, respectively. There was substantially no acetone-insoluble part. The reduced viscosity of the polymer was 9.18, 10.62 and 7.85, respectively, and was very high.

EXAMPLE 24

A copolymerization was conducted in exactly the same manner as in Example 19, except that 16.0 g. of butyl acrylate and 1.5 g. of vinyl acetate were used as the monomers. The polymerization rate was 95.0% and was substantially complete. There was no acetone-insoluble part. The reduced viscosity of the copolymer was 2.16.

EXAMPLE 25

A polymerization was conducted in exactly the same manner as in Example 17, except that 15.5 g. of methyl acrylate and 2.0 g. of methyl methacrylate were used as the monomers. The polymerization yield was 90.6%. The acetone-insoluble part was 9.6%. The reduced viscosity of the polymer was 3.60.

EXAMPLE 26

20.4 g. of methyl methacrylate were put into a glass ampoule, 0.10 g. of a metal chelate complex compound of acetylacetone and trivalent manganese and 0.012 ml. of formic acid were added thereto, the atmosphere in the ampoule was replaced with nitrogen gas and the ampoule was fuse-sealed. In this case, the metal chelate complex compound was used in an amount of 0.15 mol percent based on the mols of the monomer used and the mol ratio of the formic acid to the complex compound was 1:1. This fuse-sealed ampoule was dipped in a thermostatic bath at 50° C. and a polymerization was conducted while rotating and stirring it. After five hours, the ampoule was taken out and the contents were dissolved in acetone containing hydroquinone, and were reprecipitated with water and were dried to obtain a light brownish polymer. Further, by repeating the purification of the polymer or treating it with a metal chelating agent, such as EDTA or acetylacetone, there could be obtained a substantially colorless polymer. The polymerization yeld was 95.6%, the reduced viscosity of the polymer was 1.25 and its syndiotactic part content was 52.4%. The syndiotactic part content was computed by the method of Nishioka et al. (Kogyo Kagaku Zasshi [Journal of Industrial Chemistry], 64, 720 (1961) issued from Japan Chemical Society) from the infrared absorption spectrum of the polymer film. When the same experiment was carried out under the same conditions using oxalic acid, adipic acid and crotonic acid (a catalyst additive) in place of the formic acid, there were obtained results such that the polymerization yield was, respectively, about 100, 95.6 and 94.6% and the reduced viscosity of the polymer was, respectively, 2.48, 1.72 and 3.60. When another polymerization was conducted in the same manner without adding the carboxylic acid at all, the polymerization yield was 41.6%, the reduced viscosity was 2.10 and the syndiotactic part content was 54.2%.

EXAMPLES 27 TO 35 AND CONTROLS 16 TO 18

A polymerization was conducted in the same manner as in Example 26 using methyl methacrylate as the monomer, making the metal chelate complex compound 0.15 mol percent on the monomer, making the mol ratio of the additive to the metal chelate complex compound 1:1 and using each of the additives. The results are listed in the following table.

| Additives | Polymerization yield (percent) | Reduced viscosity of the polymer | Syndiotactic part in percent |
|---|---|---|---|
| Example No.: | | | |
| 27 Acetic acid | 96.7 | 2.46 | 58.6 |
| 28 Propionic acid | 97.6 | 1.72 | 54.6 |
| 29 Stearic acid | 94.3 | 2.95 | 55.2 |
| 30 Benzoic acid | 92.6 | 2.43 | 53.6 |
| 31 Formaldehyde | 92.3 | 1.82 | 54.6 |
| 32 Formalin | 91.5 | 1.96 | 56.5 |
| 33 Acetaldehyde | 92.6 | 3.57 | 56.5 |
| 34 Isobutylaldehyde | 90.6 | 3.24 | 58.5 |
| 35 Benzylaldehyde | 94.6 | 3.76 | 53.0 |
| Control: | | | |
| 16 Ethyl alcohol | 30.1 | 1.09 | 59.0 |
| 17 Carbon tetrachloride | 42.8 | 1.92 | 59.6 |
| 18 n-hexylamine | (¹) | | |

¹ Substantially 0.

That is to say, as is evident from the above table, with the additive of the present invention, the polymerization yield and the reduced viscosity are high but, with any other additive, the polymerization yield and the reduced viscosity of the polymer are low. The formaldehyde in Example 31 was directly absorbed into the monomer by thermodecomposing paraformaldehyde thermally. The amount of the formaldehyde in this case is not clear.

EXAMPLE 36

A polymerization was conducted in exactly the same manner as in Example 26 except that isobutyl methacrylate was used in place of the methyl methacrylate. The polymerization yield was 93.2%. The reduced viscosity of the polymer was 1.14.

EXAMPLE 37

A copolymerization was conducted in exactly the same manner as in Example 26, except that 18.0 g. of methyl methacrylate and 2.4 g. of ethyl acrylate were used as the monomers and acetaldehyde was used as the additive. The polymerization yield was 91.6%. The reduced viscosity of the polymer was 3.42.

EXAMPLE 38

A polymerization was conducted in exactly the same manner as in Example 26 except that the polymerizing temperature was 30° C. and the polymerizing time was seven hours. The polymerization yield was 90.8%. The reduced viscosity of the polymer was 1.86.

EXAMPLE 39

Acetic acid was used as the additive and the other conditions were the same as in Example 26. The variations of the polymerization rate, reduced viscosity of the polymer and syndiotactic part content in percent with the polymerizing time were measured. The results were as listed in the following table.

| Polymerization time (hrs.) | Polymerization yield (percent) | Reduced viscosity of the polymer | Syndiotactic part content (percent) |
|---|---|---|---|
| 1 | 12.5 | 0.20 | 58.6 |
| 2 | 36.8 | 0.62 | 55.5 |
| 3 | 89.2 | 1.75 | |
| 4 | 94.3 | 1.66 | |
| 5 | 96.8 | 1.84 | 57.5 |

EXAMPLE 40

A polymerization was conducted in the same manner as in Example 26 except that formalin was used as the additive and the ratio of the formalin to the complex compound was varied. The results were as listed in the following table.

| Formaldehyde/metal chelate complex compound (mol ratio) | Polymerization yield (percent) | Reduced viscosity of the polymer | Syndiotactic part content (percent) |
|---|---|---|---|
| 0.5 | 81.5 | 1.23 | |
| 1 | 92.6 | 1.82 | 57.6 |
| 2 | 96.2 | 2.25 | 56.5 |
| 5 | 76.2 | 1.43 | 56.8 |
| 10 | 42.6 | 1.07 | 58.5 |

EXAMPLE 41

21.2 g. of acrylonitrile were put into a glass ampoule, 0.21 g. of a metal chelate complex compound of acetylacetone and trivalent manganese and 0.024 ml. of formic acid were added thereto, the atmosphere in the ampoule was replaced with nitrogen gas and the ampoule was fuse-sealed. In this case, the complex compound was used in an amount of 0.15 mol percent based on the mols of the monomer used and the mol ratio of the formic acid to the complex compound was 1:1. In the following examples, unless otherwise specified the concentrations of the metal chelate complex compound and additive were the same as in this example. This fuse-sealed ampoule was dipped in a thermostatic bath at 50° C. and a polymerization was conducted while rotating and stirring it. After about five minutes after the ampoule was placed in the bath, it was recognized that the contents had solidified and the polymerizing reaction had occurred to a high degree. After five hours, the ampoule was taken out of the bath and the contents were dissolved in dimethylformamide containing hydroquinone, and were reprecipitated with methanol and were then dried to obtain a light brownish polymer. Further, by repeating the purification of the polymer or treating it with a metal chelating agent such as EDTA or acetylacetone, there could be obtained a substantially colorless polymer. The polymerization yield was 94.3% and the reduced viscosity of the polymer was 4.96 and was very high.

When another polymerization was conducted in the same manner without adding formic acid, no polymerization occurred at all.

EXAMPLES 42 TO 48 AND CONTROLS 19 TO 23

A polymerization was conducted in the same manner as in Example 41 by using each of the following-named additives. The results were as listed in the following table.

| Additives | Polymerization yield (percent) | Reduced viscosity of the polymer |
|---|---|---|
| Example No.: | | |
| 42 Acetic acid | 76.8 | 12.4 |
| 43 Propionic acid | 81.5 | 5.82 |
| 44 Stearic acid | 88.3 | 5.65 |
| 45 Benzoic acid | 79.6 | Insoluble |
| 46 Phosphoric acid (hydrous) | 65.8 | Do. |
| 47 Formalin | 85.6 | Do. |
| 48 Formaldehyde | 89.2 | Do. |
| Control: | | |
| 19 Ethyl alcohol | 0 | |
| 20 Carbon tetrachloride | 0 | |
| 21 n-hexylamine | 0 | |
| 22 Acetaldehyde | 0 | |
| 23 Isobutylaldehyde | 0 | |

That is to say, as is evident from the examples in the above table, with each additive of the present invention, a high molecular weight polymer was obtained at a high yield. On the other hand, in each control in which other additives were used, no polymer was obtained at all. The formaldehyde in Example 48 was directly absorbed into the monomer by thermodecomposing paraformaldehyde. The amount of the formaldehyde in this case is not clear.

EXAMPLE 49

A polymerization was conducted in exactly the same manner as in Example 41 except that methacrylonitrile was used in place of the acrylonitrile. The polymerization yield was 88.6%. The reduced viscosity of the polymer was 4.21.

EXAMPLE 50

A polymerization was conducted in exactly the same manner as in Example 41 except that 18.5 g. of acrylonitrile and 2.7 g. of methyl acrylate were used as the monomers. The polymerization yield was 92.4%. The reduced viscosity of the polymer was 5.35.

EXAMPLE 51

A copolymerization was conducted in exactly the same manner as in Example 47 except that 16.2 g. of acrylonitrile and 5.0 g. of styrene were used as the monomers. The polymerization yield was 90.6%. The reduced viscosity of the polymer was 4.27.

EXAMPLE 52

Two polymerizations were conducted in exactly the same manner as in Example 41 except that the polymerizing temperatures were 10 and 30° C., respectively. The polymerization yield was 88.5 and 94.6%, respectively, and the reduced viscosity was so high as to be 6.62 and 5.52, respectively.

EXAMPLE 53

A polymerization was conducted by varying the mol ratio of the formic acid to the complex compound in Example 41. The results were as listed in the following table.

| Formic acid/ metal chelate complex compound (mol ratio) | Polymerization yield (percent) | Reduced viscosity of the polymer |
| --- | --- | --- |
| 0.5 | 86.2 | 4.88 |
| 2 | 95.8 | 5.36 |
| 5 | 74.5 | 4.73 |
| 10 | 56.4 | 4.21 |

EXAMPLE 54

21.6 g. of styrene were put into a glass ampoule, 0.15 mol percent based on the mols of monomer used of a complex compound of acetylacetone and trivalent manganese and acetic acid at a mol ratio of acetic acid/complex compound of 5:1 were added thereto, the atmosphere in the ampoule was replaced with nitrogen gas and the ampoule was fuse-sealed. This fuse-sealed ampoule was dipped in a thermostatic bath at 50° C. and a polymerization was conducted while rotating and stirring it for five hours. After the polymerization, the ampoule was taken out and the contents were treated in the same manner as in Example 1 to obtain a purified polymer. The polymerization yield was 23.6% and the reduced viscosity of the polymer was 1.12.

Control 24

When a polymerization was conducted in exactly the same manner as in Example 54 except that no acetic acid was added, the polymerization yield was only 0.4%.

EXAMPLE 55

A polymerization was conducted in exactly the same manner as in Example 54 except that formaldehyde in the form of formalin was used in place of acetic acid in an equimolar amount to the metal chelate complex compound. The polymerization yield was 16.4% and the reduced viscosity of the obtained polymer was 1.24.

EXAMPLE 56

A polymerization was conducted in exactly the same manner as in Example 54 except that 18.9 g. of vinyl chloride was used in place of styrene, formic acid was used in place of acetic acid in an equimolar amount to the metal chelate complex compound and the polymerization was conducted at 40° C. for seven hours. The polymerization yield was 12.5% and the reduced viscosity of the polymer was 1.25.

Control 25

When a polymerization was conducted in exactly the same manner as in Example 56, except that no formic acid was added, no polymerization occurred at all.

EXAMPLE 57

A polymerization was conducted in exactly the same manner as in Example 56 except that formaldehyde was used in place of formic acid. The polymerization yield was 14.3% and the reduced viscosity of the polymer was 1.14.

EXAMPLE 58

A polymerization was conducted in exactly the same manner as in Example 54 except that 19.6 g. of vinylidene chloride was used in place of styrene, formaldehyde was used in place of acetic acid in an equimolar amount to the metal chelate complex compound. The polymerization yield was 11.2%.

Control 26

When a polymerization was conducted in exactly the some manner as in Example 58, except that no formaldehyde was added, no polymerization occurred at.

EXAMPLE 59

19.8 g. of 1,3-butadiene were put into a stainless ampoule, 0.15 mol percent of a metal chelate complex compound of acetylacetone and trivalent manganese based on the mols of the monomer used and formaldehyde at a mol ratio of formaldehyde to metal chelate complex compound of 2:1 were added thereto, the atmosphere in the ampoule was replaced with nitrogen gas and the ampoule was fuse-sealed. Polymerization was conducted at 120° C. for five hours under shaking. The obtained polymer was insoluble in organic solvents, probably owing to the cross-linking of the polymer, and the rate of polymerization yield was 76.5%. Further, the microstructure of the polymer obtained by an infrared spectrum measurement was 22.1% of cis 1, 4 polymer, 52.9% of trans 1, 4 polymer and 25.0% of 1,2-vinyl polymer.

Control 27

When a polymerization was conducted in exactly the same manner as in Example 59, except that no formaldehyde was added, the polymerization yield was only 10.2% and the micro-structure was 13.4% of cis 1,4 polymer, 62.1% of trans 1,4 polymer and 24.5% of 1,2-vinyl polymer.

Metal chelate complex compounds of acetylacetone and trivalent manganese for use in the present invention are commercially available, for example, from MacKenzie Chemical Works, Inc. of New York and Organic/Inorganic Chemical Company of California. The foregoing examples used the metal chelate complex of MacKenzie Chemical Works, Inc. The method of making such a metal chelate complex is described in a paper by G. H. Cartledge in the Journal of the American Chemical Society, volume 73, page 4416, U.S. Pat. No. 2,556,316 and German Pat. No. 1,180,522.

The embodiments of the invention in which an exclusive property or privilege is claimed are defined as follows:

1. A polymerization catalyst consisting essentially of a metal chelate complex compound of acetylacetone with trivalent manganese,
   and an additive compound selected from the group consisting of mono- and di-carboxylic acids of aliphatic and aromatic hydrocarbons, monoaldehydes of saturated aliphatic acid aromatic hydrocarbons, lower primary alkanols, primary alkylamines having 4 to 8 carbon atoms, zinc chloride, hydrochloric acid and phosphoric acid, the additive compound being present in an amount in the range of from 0.1 to 10 mols per one mol of the metal chelate complex compound.

2. A polymerization catalyst composition according to claim 1 wherein said additive compound is an acid selected from the group consisting of formic acid, acetic acid, propionic acid, butyric acid, valeric acid, lauric acid, myristic acid, palmitic acid, stearic acd, benzoic acid, oxalic acid, adipic acid, sebacic acid, terephthalic acid, isophthalic acid, crotonic acid, itaconic acid, acrylic acid, fumaric acid and cinnamic acid.

3. A polymerization catalyst composition according to claim 1 wherein said additive compound is an aldehyde selected from the group consisting of formaldehyde, acetaldehyde, n - butylaldehyde, isobutylaldehyde and benzylaldehyde.

4. A polymerization catalyst composition according to claim 1 wherein said additive compound is a lower primary alkanol selected from the group consisting of methanol, ethanol, propanol, n-butanol and isobutanol.

5. A polymerization catalyst composition according to claim 1 wherein said additive compound is a primary alkyl amine selected from the group consisting of butylamine, n-hexylamine and octylamine.

References Cited
UNITED STATES PATENTS

| | | | |
|---|---|---|---|
| 3,267,076 | 8/1966 | Ishii et al. | 252—431 X |
| 3,468,860 | 9/1969 | Hsieh et al. | 252—431 X |

PATRICK P. GARVIN, Primary Examiner

U.S. Cl. X.R.

252—428, 429, 431 C, 431 N; 260—85.7, 86.1, 87.5, 87.7, 89.1, 89.5, 88.7, 93.5, 92.8, 91.7, 695

UNITED STATES PATENT OFFICE
CERTIFICATE OF CORRECTION

Patent No. 3,634,329  Dated January 11, 1972

Inventor(s) Kiyoshi Chujo and Zenjiro Honda

It is certified that error appears in the above-identified patent and that said Letters Patent are hereby corrected as shown below:

Column 14, line 72; change "aliphatic acid aromatic" to ---aliphatic and aromatic---

Signed and sealed this 27th day of June 1972.

(SEAL)
Attest:

EDWARD M. FLETCHER, JR.
Attesting Officer

ROBERT GOTTSCHALK
Commissioner of Patents